Jan. 7, 1947. B. BOGOSLOWSKY 2,413,687
METHOD AND APPARATUS FOR MAKING COFFEE INFUSIONS
Filed Aug. 17, 1943
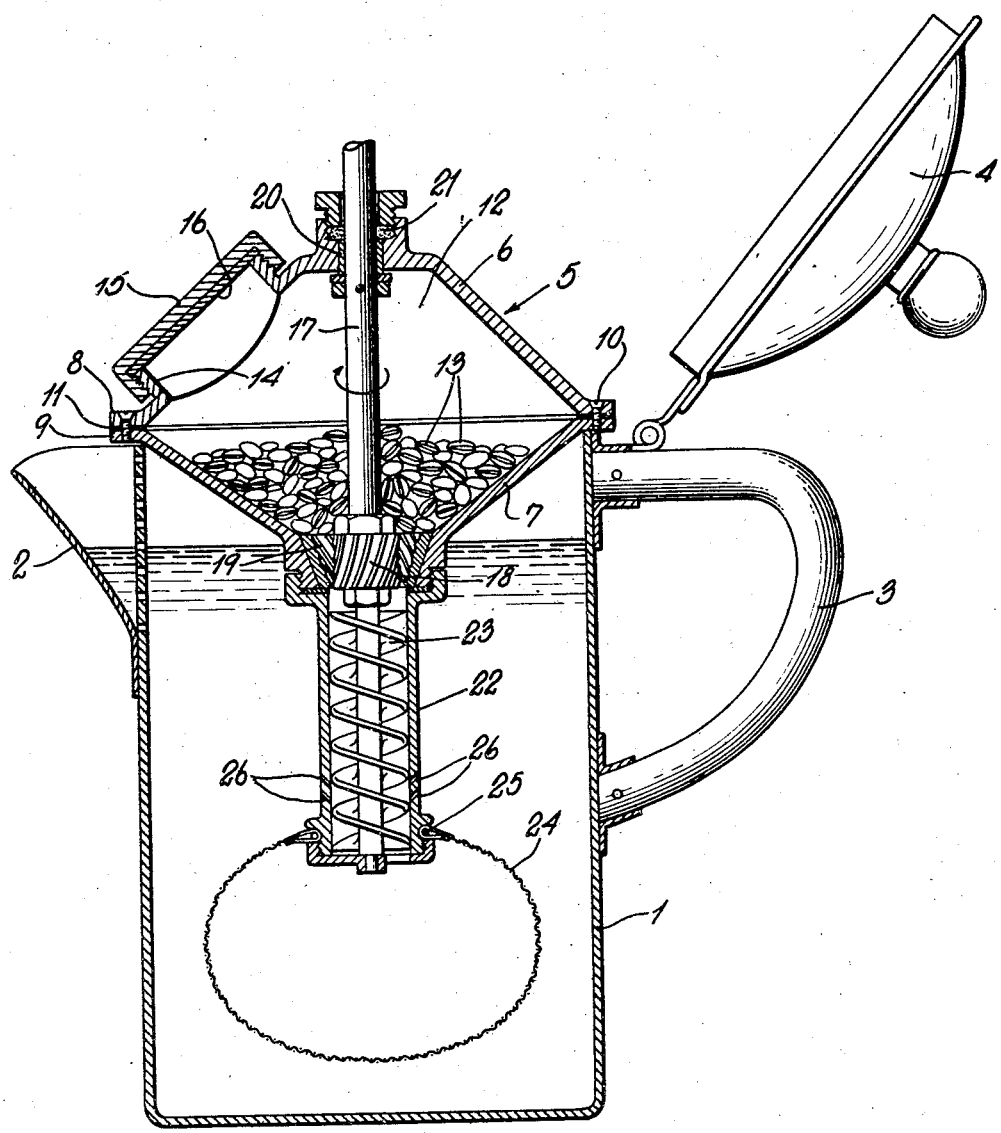
INVENTOR
Boris Bogoslowsky
BY
Emery, Varney, Whittemore & Dix
ATTORNEYS Patented Jan. 7, 1947

2,413,687

UNITED STATES PATENT OFFICE 2,413,687

METHOD AND APPARATUS FOR MAKING COFFEE INFUSIONS

Boris Bogoslowsky, Jackson Heights, N. Y.

Application August 17, 1943, Serial No. 498,914

6 Claims. (Cl. 99—71)

This invention relates to the art of making an infusion of coffee suitable for use as a beverage.

In studies which have been made of coffee in the past, it has been found that a considerable quantity of carbon dioxide gas is generated in coffee beans in the roasting process. It has also been found that a gradual loss of the carbon dioxide so generated occurs after roasting, and that the degree of such loss furnishes a reasonably direct measure of the loss of flavor value of the coffee. That is, freshly roasted coffee which contains the maximum carbon dioxide content is full flavored, whereas roasted coffee which has been stored for a considerable period of time under conditions which permit loss of its original carbon dioxide content is stale and weak in flavor. It appears therefore that the carbon dioxide serves as a carrier for the flavor constituents of the coffee, and that the carbon dioxide gas which is lost carries off valuable flavor constituents as it escapes.

It has also been found that a large proportion of the carbon dioxide content of roasted coffee beans is lost during the grinding process which is commonly resorted to preparatory to making a coffee infusion for beverage use. The finer the grind the greater the loss, but the loss may amount to 40% to 60% of the original carbon dioxide content of the roasted beans which are ground.

Furthermore it has been found that after grinding, the ground coffee loses its remaining carbon dioxide content far more rapidly than the bean. As a result if two identical samples of roasted coffee beans are selected, and one sample is retained unground and exposed to atmosphere for a period of one week and the other sample is ground and retained under the same conditions for the same period, the unground sample will lose relatively little of its carbon dioxide content, perhaps 5% to 10%, and hence will lose little of its flavor, while the ground sample will lose a large part of its carbon dioxide content, perhaps 75% to 80%, and hence will lose a large part of its flavor.

Various expedients have been resorted to in order to prevent such loss. Coffee has been packed in sealed tins, sometimes under vacuum, but in the case of ground coffee this fails to prevent the large loss which occurs during grinding and the subsequent loss which occurs as soon as the tin is opened. Frequent and rapid delivery of ground coffee to the consumer has also been resorted to and widely publicized, but again this fails to prevent the losses above noted. There has also been a reversion to an older practice of selling coffee to the consumer in the bean for grinding by the consumer immediately before preparing an infusion. While this practice prevents the rapid loss which occurs after coffee is ground, and thus results perhaps in less loss than by any other method, it still fails to prevent the loss which occurs during the grinding operation, which loss is the most serious of all.

It is an object of the present invention to provide a method of making an infusion of coffee directly from roasted coffee beans under conditions such that the losses of carbon dioxide and flavor constituents which commonly occur during and after grinding are substantially reduced.

It is a further object of the invention to provide a coffee making apparatus in which said method may be practiced conveniently.

Other objects and advantages of the invention will appear hereinafter.

A preferred embodiment of the invention selected for purposes of illustration is shown in the accompanying drawing, in which the figure is a vertical cross section through the apparatus.

According to the present invention I grind coffee beans in a sealed container having its sole discharge passage submerged in and sealed by hot water in which the infusion is to be made, and I discharge the ground coffee and carbon dioxide gas released by such grinding directly into the hot water in order that the flavor constituents carried by the released gas may be absorbed by the hot water, and in order that the flavor constituents remaining in the ground coffee may be absorbed by the hot water with minimim opportunity for loss of such flavor constituents to the atmosphere.

Thus, referring to the drawings, I provide a hot water container 1 which may be of any desired size and shape, and which may be heated in any suitable manner, as by a flame or by an electric heating element. According to well established practice, the optimum temperature for making a coffee infusion is slightly below the boiling point of water at normal atmospheric pressure, although I include within the term "hot water" as used in this specification the normal range of temperatures used for making coffee infusions, as from 170° F. to 212° F.

The container may be made of any suitable material such as metal or glass or any of the other materials commonly used for coffee makers, and in the case of small sizes intended for household use may be provided with a spout 2, a handle 3 and a hinged cover 4. In the case of larger sizes intended for restaurant or hotel use, the container may be of the usual urn type.

Mounted on the container 1 in any suitable manner, as by engagement with the upper rim of the container, as shown, is a grinder unit 5 comprising a sealed shell consisting of upper and lower conical members 6 and 7 secured together along their peripheral flanges 8 and 9 by screws 10, a gasket 11 being interposed between said flanges to insure a tight seal. The shell provides a sealed grinding compartment 12 into which coffee beans 13 may be introduced in any suitable manner, as through the threaded neck 14, having a screw closure cap 15 which may be sealed by the gasket 16 to provide an air tight closure.

A shaft 17 extends vertically through the grinder unit, said shaft carrying the movable element 18 of the grinder, the stationary element 19 being carried by the lower conical member 7 of the shell. The upper end of the shaft projects through a bearing 20 in the upper conical member 6 and is sealed by a packing ring 21. The shaft 17 may be rotated in any suitable manner, either by hand, through a suitable crank, or by electric motor.

Connected to the shell, immediately below the grinder elements 18 and 19 is a tube 22 communicating with the compartment 12 through the space between the grinder members 18 and 19, and forming the sole passage for the discharge or escape of the contents of the compartment. Being concentric with the grinder members, the ground coffee and any carbon dioxide gas released during the grinding are delivered to the tube 22 and discharged from the tube at a point below the surface of the hot water in the container. A screw conveyor 23 may be inserted in the tube 22, connected to the shaft 17 for rotation thereby, said conveyor being adapted to feed the ground coffee downwardly as delivered by the grinder. For convenience in cleaning the grinder unit, the tube 22 may be removable from the shell, as by the provision of a screw thread, as shown.

A suitable filter or strainer 24 may be secured to the lower end of the tube 22 to receive the ground coffee discharged from the tube 22 and to retain the same submerged in the hot water. The said filter may be made of any suitable material such as cloth, filter paper, wire mesh and the like, being held in place by a retaining ring 25.

In order to provide circulation of hot water through the filter compartment, a plurality of small passages 26 may be cut through the wall of the tube 22, preferably near the discharge end thereof, said passages being preferably inclined downwardly, as shown. As the screw conveyor rotates in the tube, a pumping action occurs which draws water into the tube through the passages 26 and circulates it through the filter compartment thus hastening the infusion process.

In making a coffee infusion, the water in the container 1 is preferably first heated to the boiling point and the temperature is then reduced to a point slightly below the boiling point. In the meantime, the proper quantity of coffee beans has been introduced into the shell, and the closure cap 15 tightly closed. The grinder unit is then placed on the container in the manner shown, with the end of the discharge passage well below the surface of the hot water. The shaft 17 is then rotated by a crank or by an electric motor to grind the coffee beans and to discharge the ground coffee and any released carbon dioxide gas into the hot water. As soon as grinding is started, carbon dioxide gas will be released, and the pressure in the sealed compartment will be raised somewhat, causing the water in the tube 22 to be discharged, and allowing the carbon dioxide gas to pass through the hot water where the flavor constituents carried by the gas are absorbed by the water. When the carbon dioxide gas has been released, the pressure in the sealed compartment will be equalized, and the pumping action of the screw conveyor 23 circulates hot water through the filter chamber to hasten the infusion process. After the coffee is ground and discharged into the hot water, the grinder unit may be removed from the container as soon as the infusion has reached the desired strength.

It will be understood that the invention may be variously modified and embodied within the scope of the subjoined claims.

I claim as my invention:

1. The process of making an infusion of coffee from roasted coffee beans which comprises grinding roasted coffee beans in a sealed compartment and discharging the ground coffee, the carbon dioxide gas released by such grinding and the flavor constituents carried by such gas directly and continuously as said coffee beans are ground from said sealed compartment into hot water at a point below the surface thereof.

2. The process of making an infusion of coffee from roasted coffee beans which comprises grinding roasted coffee beans in a sealed compartment and discharging the ground coffee, the carbon dioxide gas released by such grinding and the flavor constituents carried by such gas directly and continuously as said coffee beans are ground from said sealed compartment into a filter compartment submerged in hot water.

3. The process of making an infusion of coffee from roasted coffee beans which comprises grinding roasted coffee beans in a sealed compartment, discharging the ground coffee, the carbon dioxide gas released by such grinding and the flavor constituents carried by such gas directly and continuously as said coffee beans are ground from said sealed compartment into a filter compartment submerged in hot water, and circulating hot water through said filter compartment.

4. Apparatus for making an infusion of coffee comprising, a liquid container, a grinder unit extending into said container, said grinder unit having a compartment with air tight closure, grinding means enclosed within said compartment, a tube communicating with said compartment and extending to a point below the surface of the liquid in said container, a screw conveyor in said tube adapted to move ground coffee through said tube, a filter secured to said tube providing a filter compartment adapted to receive ground coffee discharged from said tube, said tube being provided with apertures through the wall thereof, which said apertures cooperate with said screw conveyor to cause circulation of water through said filter compartment.

5. Apparatus for making an infusion of coffee, comprising, a liquid container, a grinder unit extending into said container, said grinder unit having a compartment with air-tight closure, grinding means enclosed within said compartment, a tube communicating with said compartment and extending to a point below the surface of the liquid in the container, a screw conveyor in said tube adapted to move ground coffee through said tube, and a filter secured to the lower end of said tube providing a filter compartment adapted to receive ground coffee discharged from said tube, said filter compartment being submerged in the liquid in the container.

6. Apparatus for making an infusion of coffee comprising, a liquid container, a grinder unit extending into said container, said grinder unit having a compartment with air tight closure, grinding means enclosed within said compartment, and means providing a passage communicating with said compartment and extending to a point below the surface of the liquid in said container, and means in said passage to discharge ground coffee from said passage into said liquid below the surface thereof directly and continuously as said coffee beans are ground.

BORIS BOGOSLOWSKY.